United States Patent
Ohtomo et al.

(10) Patent No.: US 10,927,225 B2
(45) Date of Patent: Feb. 23, 2021

(54) AROMATIC POLYETHER MICROPARTICLES, METHOD FOR PRODUCING CURED RESIN PRODUCT, AND METHOD FOR PRODUCING CARBON-FIBER-REINFORCED COMPOSITE MATERIAL

(71) Applicant: Sumitomo Chemical Company, Limited, Tokyo (JP)

(72) Inventors: Shinji Ohtomo, Tsukuba (JP); Yoshio Shoda, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 21 days.

(21) Appl. No.: 16/333,090

(22) PCT Filed: Sep. 14, 2017

(86) PCT No.: PCT/JP2017/033254
§ 371 (c)(1),
(2) Date: Mar. 13, 2019

(87) PCT Pub. No.: WO2018/052079
PCT Pub. Date: Mar. 22, 2018

(65) Prior Publication Data
US 2019/0270855 A1 Sep. 5, 2019

(30) Foreign Application Priority Data
Sep. 16, 2016 (JP) ............................. JP2016-181324

(51) Int. Cl.
| | | |
|---|---|---|
| C08J 5/04 | (2006.01) |
| C08J 5/24 | (2006.01) |
| C08G 65/40 | (2006.01) |
| C08L 63/00 | (2006.01) |
| C08K 7/06 | (2006.01) |
| C08L 71/10 | (2006.01) |

(52) U.S. Cl.
CPC .............. *C08J 5/042* (2013.01); *C08G 65/40* (2013.01); *C08J 5/24* (2013.01); *C08K 7/06* (2013.01); *C08L 63/00* (2013.01); *C08L 71/10* (2013.01); *C08J 2203/22* (2013.01); *C08J 2371/10* (2013.01); *C08J 2463/00* (2013.01)

(58) Field of Classification Search
CPC ........ C08F 5/042; C08F 5/24; C08F 2203/22; C08F 2371/11; C08F 2463/00
See application file for complete search history.

(56) References Cited

U.S. PATENT DOCUMENTS

| | | |
|---|---|---|
| 6,562,935 B1 | 5/2003 | Harada |
| 2012/0190764 A1 | 7/2012 | Kohinata et al. |

FOREIGN PATENT DOCUMENTS

| | | | |
|---|---|---|---|
| EP | 2189487 A1 | 5/2010 |
| EP | 2902435 A1 | 8/2015 |
| EP | 3412702 A1 | 12/2018 |
| EP | 2 189 487 A1 * | 5/2020 |
| JP | H07330891 A | 12/1995 |
| JP | 200095863 A | 4/2000 |
| JP | 2007231234 A | 9/2007 |
| JP | 2011094111 A | 5/2011 |
| JP | 2013064128 A | 4/2013 |
| JP | 2013206786 A | 10/2013 |
| WO | 2017135376 A1 | 8/2017 |

OTHER PUBLICATIONS

Int'l Search Report dated Nov. 21, 2017 in Int'l Application No. PCT/JP2017/033254.
Extended European Search Report dated Feb. 26, 2020 in EP Application No. 17850980.8.
Office Action dated Sep. 23, 2020 in CN Application No. 201780057257.2 (English Machine Translation).

* cited by examiner

*Primary Examiner* — Robert D Harlan
(74) *Attorney, Agent, or Firm* — Panitch Schwarze Belisario & Nadel LLP

(57) ABSTRACT

Aromatic polyether microparticles contain a plurality of particles containing an aromatic polyether in which a content of the particles having a particle diameter equal to or smaller than 50 μm to a total volume of the aromatic polyether microparticles is equal to or higher than 50% by volume. The aromatic polyether microparticles contain phenolic hydroxyl groups in a content equal to or greater than 80 μmol/g.

8 Claims, 3 Drawing Sheets

AROMATIC POLYETHER MICROPARTICLES, METHOD FOR PRODUCING CURED RESIN PRODUCT, AND METHOD FOR PRODUCING CARBON-FIBER-REINFORCED COMPOSITE MATERIAL

CROSS-REFERENCE TO RELATED APPLICATIONS

This application is a Section 371 of International Application No. PCT/JP2017/033254, filed Sep. 14, 2017, which was published in the Japanese language on Mar. 22, 2018 under International Publication No. WO 2018/052079 A1, which claims priority under 35 U.S.C. § 119(b) to Japanese Application No. 2016-181324, filed Sep. 16, 2016, the disclosures of which are incorporated herein by reference.

The present invention relates to aromatic polyether microparticles, a method for producing a cured resin product, and a method for producing a carbon-fiber-reinforced composite material.

BACKGROUND ART

A carbon-fiber-reinforced composite material (hereinafter, referred to as "CFRP" in some cases) in which carbon fiber is used as reinforcing fiber is known to be lightweight and have excellent hardness. As the method for producing CFRP, a method is frequently used in which a plurality of sheets of prepreg as a sheet-like intermediate material obtained by impregnating carbon fiber with a matrix resin is laminated and then the matrix resin is cured.

As the matrix resin used in the prepreg, from the viewpoint of heat resistance or productivity, a thermosetting resin composition is mainly used. Particularly, from the viewpoint of mechanical properties such as adhesiveness with respect to carbon fiber, an epoxy resin composition is preferably used.

Although the epoxy resin composition has extremely excellent heat resistance, brittleness thereof is an issue. Therefore, it is known that at the time of producing the epoxy resin composition, the composition is formed into a composite with a thermoplastic resin so as to improve toughness. As such a thermoplastic resin, from the viewpoint of heat resistance or chemical resistance, aromatic polyether is used in some cases.

As a result of a curing reaction, the epoxy resin and the aromatic polyether form a phase separation structure such as a co-continuous phase or a sea-island phase. From the viewpoint of mechanical properties, the phase separation structure is preferably a co-continuous phase.

As the aromatic polyether used in CFRP, from the viewpoint of reactivity with an epoxy resin, aromatic polyether having a phenolic hydroxyl group on a terminal thereof is frequently used (see Patent Document 1).

CITATION LIST

Patent Literature

[Patent Document 1] Japanese Unexamined Patent Application, First Publication No. 2007-231234

SUMMARY OF INVENTION

Technical Problem

However, at the time of producing CFRP, in a case where the aromatic polyether described in Patent Document 1 is dissolved in a liquid epoxy resin, sometimes it takes a long time for dissolution. Furthermore, the viscosity of a liquid resin component obtained by dissolving the aromatic polyether in the epoxy resin is high, and accordingly, sometimes handleability is poor. In addition, it is a problem that the temperature at which the epoxy resin and the aromatic polyether form a cured resin product having a co-continuous phase is high. Therefore, the aromatic polyether described in Patent Document 1 has a problem of having productivity that is insufficient for producing CFRP. The aromatic polyether described in Patent Document 1 also has a problem of having productivity that is insufficient not only for producing CFRP but also for producing a composite containing a thermosetting resin and an aromatic polyether.

The present invention has been made in consideration of the above circumstances, and an object thereof is to provide aromatic polyether microparticles exhibiting excellent productivity in producing a composite containing a thermosetting resin and aromatic polyether. Another object of the present invention is to provide a method for producing a cured resin product and a method for producing a carbon-fiber-reinforced composite material in which the aromatic polyether microparticles are used.

Solution to Problem

In order to achieve the aforementioned objects, an aspect of the present invention provides aromatic polyether microparticles which contain an aromatic polyether as a material forming the particles and contain phenolic hydroxyl groups in a content equal to or greater than 80 μmol/g, in which a proportion of particles having a particle diameter equal to or smaller than 50.0 μm is equal to or higher than 50% by volume.

In an aspect of the present invention, a maximum particle diameter is preferably equal to or smaller than 2 mm, and a proportion of particles having a particle diameter equal to or smaller than 160 μm is preferably equal to or higher than 95% by volume.

In an aspect of the present invention, an angle of repose is preferably equal to or greater than 30*.

In an aspect of the present invention, a reduced viscosity is preferably equal to or lower than 0.36 dL/g.

In an aspect of the present invention, the aromatic polyether microparticles may contain an organic solvent in an amount equal to or smaller than 5,000 ppm.

In an aspect of the present invention, an ash content may be equal to or smaller than 0.5%.

An aspect of the present invention provides a method for producing a cured resin product including a step of dissolving the aromatic polyether microparticles in an epoxy resin so as to obtain a solution, and a step of curing the obtained solution.

An aspect of the present invention provides a method for producing a carbon-fiber-reinforced composite material including a step of dissolving the aromatic polyether microparticles in an epoxy resin so as to obtain a solution, a step of impregnating carbon fiber with the obtained solution, and a step of curing the solution with which the carbon fiber is impregnated.

That is, the present invention has the following aspects.

[1] Aromatic polyether microparticles containing a plurality of particles containing an aromatic polyether, in which a content of the particles having a particle diameter equal to or smaller than 50 μm is equal to or higher than 50% by volume with respect to a total volume of the aromatic polyether microparticles and the aromatic polyether microparticles contain phenolic hydroxyl groups in a content equal to or greater than 80 µmol/g.

[2] The aromatic polyether microparticles described in [1], in which a maximum particle diameter is 2 mm, and a content of the particles having a particle diameter equal to or smaller than 160 µm is equal to or higher than 95% by volume with respect to the total volume of the aromatic polyether microparticles.

[3] The aromatic polyether microparticles described in [1] or [2], which have an angle of repose equal to or greater than 30°.

[4] The aromatic polyether microparticles described in any one of [1] to [3], in which the aromatic polyether has a reduced viscosity equal to or lower than 0.36 d㎕/g.

[5] The aromatic polyether microparticles described in any one of [1] to [4], containing an organic solvent in an amount equal to or smaller than 5,000 ppm with respect to a total mass of the aromatic polyether microparticles.

[6] The aromatic polyether microparticles described in any one of [1] to [5], in which an ash content is equal to or smaller than 0.5% by mass with respect to a total mass of the aromatic polyether microparticles.

[7] A method for producing a cured resin product, including a step of dissolving the aromatic polyether microparticles described in any one of [1] to [6] in an epoxy resin to obtain a solution, and a step of curing the solution to obtain a cured resin product.

[8] A method for producing a carbon-fiber-reinforced composite material, including a step of dissolving the aromatic polyether microparticles described in any one of [1] to [6] in an epoxy resin to obtain a solution, a step of impregnating carbon fiber with the solution, and a step of curing the solution, with which the carbon fiber is impregnated, to obtain a carbon-fiber-reinforced composite material.

Advantageous Effects of Invention

According to an aspect of the present invention, there is provided aromatic polyether microparticles which exhibit excellent productivity in producing a composite containing a thermosetting resin and aromatic polyether. Furthermore, there are provided a method for producing a cured resin product and a method for producing a carbon-fiber-reinforced composite material in which the aromatic polyether microparticles are used.

DESCRIPTION OF EMBODIMENTS

<Aromatic Polyether Microparticles>

Figure 1:
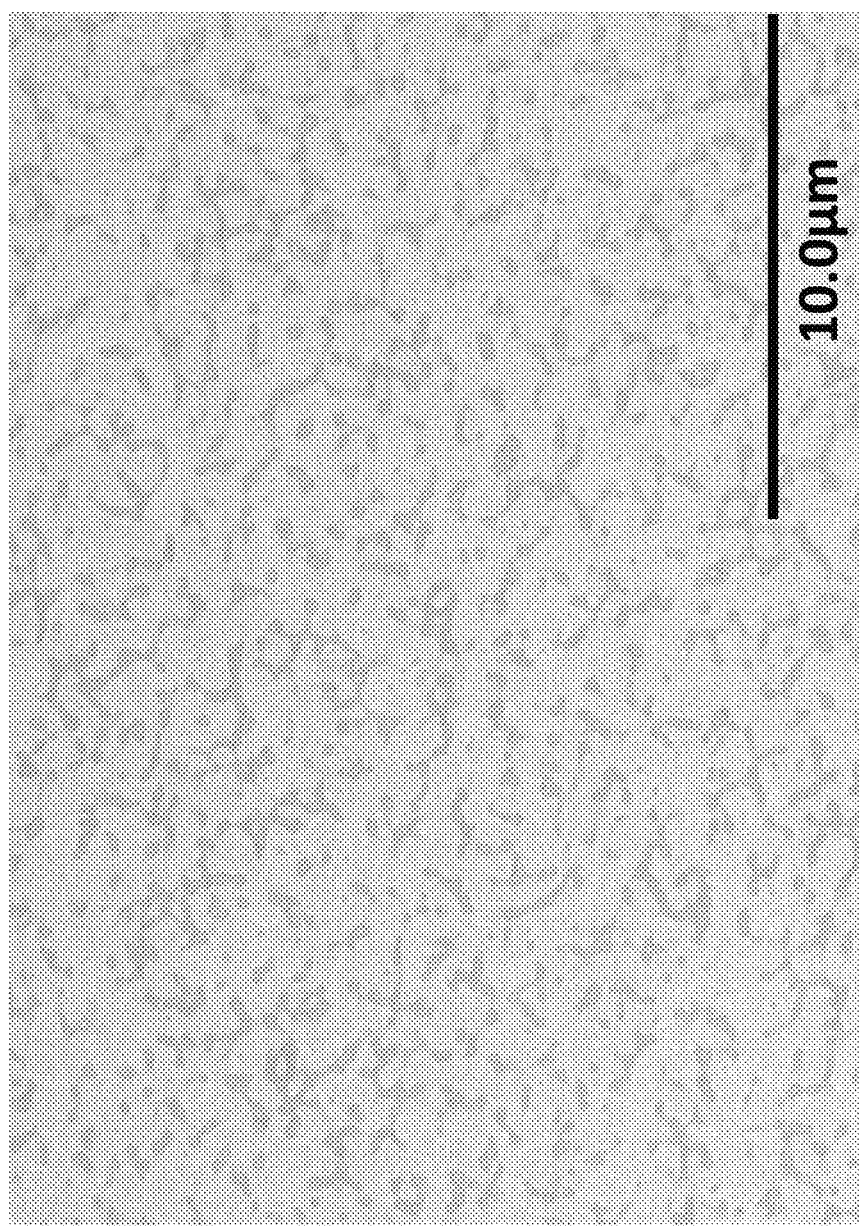
FIG. 1 is a STEM image showing a phase separation structure of Example 1.

The aromatic polyether microparticles of the present embodiment contain phenolic hydroxyl groups in a content equal to or greater than 80 µmol/g, in which a proportion of particles having a particle diameter equal to or smaller than 50.0 µm is equal to or higher than 50% by volume with respect to the total volume of the aromatic polyether microparticles.

The aromatic polyether microparticles of an aspect of the present invention are formed of a material which is thermoplastic aromatic polyether. That is, the aromatic polyether microparticles of the present embodiment contain a plurality of particles containing thermoplastic aromatic polyether. "The aromatic polyether microparticles are formed of a material which is aromatic polyether" means that the aromatic polyether microparticles contain the aromatic polyether in a content equal to or greater than 95% by mass with respect to the total mass of the aromatic polyether microparticles. The aromatic polyether microparticles of the present embodiment contain the aromatic polyether preferably in a content equal to or greater than 98% by mass and more preferably in a content equal to or greater than 99% by mass, with respect to the total mass of the aromatic polyether microparticles.

In an aspect, the aromatic polyether microparticles of the present embodiment contain components other than the aromatic polyether in a content equal to or smaller than 5% by mass. Examples of "components other than the aromatic polyether" include a monomer, an acid catalyst, or an organic solvent used in the polymerization reaction of the aromatic polyether, ash generated by the polymerization reaction, and the like.

The thermoplastic aromatic polyether has a repeating unit represented by General Formula (E).

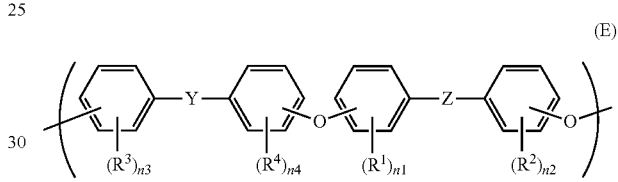

(E)

(In Formula (E), Y represents —SO$_2$— or —CO—. Z represents an alkylidene group having 1 to 10 carbon atoms, —SO$_2$—, or —CO—. R$^1$, R$^2$, R$^3$, and R$^4$ each independently represent an alkyl group having 1 to 4 carbon atoms or an alkoxy group having 1 to 4 carbon atoms. n$^1$, n$^2$, n$^3$, and n$^4$ each independently represent an integer of 0 to 4. In a case where each of n$^1$, n$^2$, n$^3$, and n$^4$ is an integer of 2 to 4, a plurality of R$^1$'s, R$^2$'s, R$^3$'s, or R$^4$'s may be the same as or different from each other.)

In the present specification, the aromatic polyether represented by Formula (E), in which Y is a sulfonyl group (—SO$_2$—) and Z is a sulfonyl group or an alkylidene group having 1 to 10 carbon atoms, is referred to as "aromatic polyether sulfone". Furthermore, the aromatic polyether represented by Formula (E), in which Y is a carbonyl group (—CO—) and Z is a carbonyl group or an alkylidene group having 1 to 10 carbon atoms, is referred to as "aromatic polyether ketone".

In Formula (E), Y and Z are preferably sulfonyl groups. The aromatic polyether in which Y and Z are sulfonyl groups is particularly referred to as "PES" in some cases.

The aromatic polyether can be obtained by polymerizing a dihalogeno compound (A) represented by General Formula (A) (hereinafter, simply referred to as "dihalogeno compound (A)" in some cases) and a divalent phenol (B) represented by General Formula (B) (hereinafter, simply referred to as "divalent phenol (B)" in some cases).

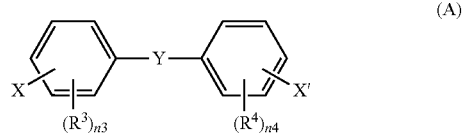

(A)

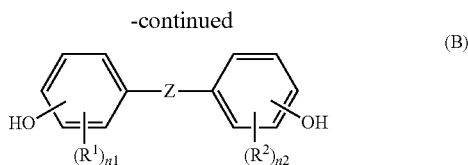

(In Formula (A), X and X' each independently represent a halogen atom. In Formula (A) or Formula (B), Y and Z are the same as Y and Z described above. $R^1$, $R^2$, $R^3$, and $R^4$ are the same as $R^1$, $R^2$, $R^3$, and $R^4$ described above. $n^1$, $n^2$, $n^3$, and $n^4$ are the same as $n^1$, $n^2$, $n^3$, and $n^4$ described above. In a case where $n^1$, $n^2$, $n^3$, or $n^4$ is an integer of 2 to 4, a plurality of $R^1$'s, $R^2$'s, $R^3$'s, or $R^4$'s may be the same as or different from each other.)

[Dihalogeno Compound (A)]

The dihalogeno compound (A) is represented by General Formula (A).

In Formula (A), X and X' each independently represent a halogen atom. Examples of the halogen atom include a chlorine atom, a bromine atom, and an iodine atom. Among these, a chlorine atom is preferable.

Provided that a position number of each carbon atom to which Y is bonded is position 1, the halogen atoms represented by X and X' may be bonded to any of carbon atoms on position 2, position 3, and position 4. However, it is preferable that the halogen atoms are preferably bonded to a carbon atom on position 4. Here, the carbon atoms to which the halogen atom represented by X and X' can be bonded do not include the carbon atom to which $R^3$ or $R^4$ is bonded.

As described above, Y represents —$SO_2$— or —CO—. Y is preferably —$SO_2$—.

That is, the dihalogeno compound (A) is preferably bis(4-chlorophenyl)sulfone. Instead of a hydrogen atom, either or both of the groups represented by $R^3$ and $R^4$ may be bonded to the bis(4-chlorophenyl)sulfone.

In Formula (A), $R^3$ and $R^4$ each independently represent an alkyl group having 1 to 4 carbon atoms or an alkoxy group having 1 to 4 carbon atoms.

The alkyl groups represented by $R^3$ and $R^4$ may be any of linear, branched, and cyclic alkyl groups. The alkyl groups are preferably linear or branched alkyl groups. Examples of the alkyl groups include a methyl group, an ethyl group, a n-propyl group, an isopropyl group, a n-butyl group, an isobutyl group, a sec-butyl group, and a tert-butyl group.

The alkoxy groups represented by $R^3$ and $R^4$ may be any of linear, branched, and cyclic alkoxy groups. The alkoxy groups are preferably linear or branched alkoxy groups. Examples of the alkoxy groups include a methoxy group, an ethoxy group, a n-propoxy group, an isopropoxy group, a n-butoxy group, an isobutoxy group, a sec-butoxy group, and a tert-butoxy group.

In Formula (A), $n^3$ is the number of bonds of $R^3$. Furthermore, in Formula (A), $n^4$ is the number of bonds of $R^4$. $n^3$ and $n^4$ each independently represent an integer of 0 to 4.

In a case where $n^3$ and $n^4$ are integers other than 0, the binding position of the corresponding $R^3$ or $R^4$ is not particularly limited. In a case where $n^3$ and $n^4$ are integers other than 0, provided that a position number of each carbon atom to which Y is bonded is position 1, each of the groups represented by $R^3$ or $R^4$ may be bonded to any of carbon atoms on position 2, position 3, position 4, position 5, and position 6. The group is preferably bonded to a carbon atom other than the carbon atom on position 4, and preferably bonded to a carbon atom other than the carbon atom on position 3 or position 5. Here, the carbon atoms to which the groups represented by $R^3$ and $R^4$ are bonded do not include the carbon atom to which X or X' is bonded.

In a case where $n^3$ or $n^4$ is an integer of 2 to 4, a plurality of $R^3$'s or $R^4$'s may be the same as or different from each other. For example, in a case where $n^3$ is an integer of 2 to 4, all of $n^3$ pieces of $R^3$ may be the same as or different from each other. Furthermore, in a case where $n^3$ is 3 or 4, only some of $R^3$'s may be the same as each other. The same is true for $n^4$ pieces of $R^4$.

$n^3$ and $n^4$ preferably each independently represent an integer of 0 to 3, more preferably each independently represent an integer of 0 to 2, and particularly preferably each independently represent 0 or 1.

Examples of a preferable dihalogeno compound (A) include bis(4-chlorophenyl)sulfone (referred to as 4,4'-dichlorodiphenylsulfone as well).

[Divalent Phenol (B)]

The divalent phenol (B) is represented by General Formula (B).

In the divalent phenol (B), provided that a position number of each carbon atom to which each Z is bonded is position 1, two hydroxy groups (—OH) may be bonded to any of carbon atoms on position 2, position 3, and position 4. However, it is preferable that the hydroxy groups are bonded to a carbon atom on position 4. Here, the carbon atoms to which two hydroxy groups are bonded do not include the carbon atom to which $R^1$ or $R^2$ is bonded.

In Formula (B), as described above. Z represents an alkylidene group having 1 to 10 carbon atoms, —$SO_2$—, or —CO—. Z is preferably —$SO_2$—.

That is, the divalent phenol (B) is preferably bis(4-hydroxyphenyl)sulfone (4,4'-dihydroxydiphenylsulfone).

Instead of a hydrogen atom, either or both of the groups represented by $R^1$ and $R^2$ may be bonded to the bis(4-hydroxyphenyl)sulfone (4,4'-dihydroxydiphenylsulfone).

In Formula (B), $R^1$ and $R^2$ each independently represent an alkyl group having 1 to 4 carbon atoms or an alkoxy group having 1 to 4 carbon atoms. The alkyl group having 1 to 4 carbon atoms and the alkoxy group having 1 to 4 carbon atoms have the same definition as the alkyl group having 1 to 4 carbon atoms and the alkoxy group having 1 to 4 carbon atoms represented by $R^3$ and $R^4$, and examples of groups preferable as the alkyl group and the alkoxy group are also the same.

$n^1$ is the number of bonds of $R^1$. Furthermore, $n^2$ is the number of bonds of $R^2$. $n^1$ and $n^2$ each independently represent an integer of 0 to 4. $n^1$ and $n^2$ are regarded as the same as $n^3$ and $n^4$.

That is, in a case where $n^1$ and $n^2$ are integers other than 0, the binding position of the corresponding $R^1$ or $R^2$ is not particularly limited. In a case where $n^1$ and $n^2$ are integers other than 0, provided that a position number of each carbon atom to which Z is bonded is position 1, the group represented by the corresponding $R^1$ or $R^2$ may be bonded to any of carbon atoms on position 2, position 3, position 4, position 5, and position 6. However, the group is preferably bonded to a carbon atom other than the carbon atom on position 4, and preferably bonded to a carbon atom on position 3 or position 5. Here, the carbon atoms to which the groups represented by $R^1$ and $R^2$ are bonded do not include the carbon atoms to which two hydroxy groups are bonded.

In a case where $n^1$ or $n^2$ is an integer of 2 to 4, a plurality of $R^1$'s or $R^2$'s may be the same as or different from each other. For example, in a case where $n^1$ is an integer of 2 to 4, all of $n^1$ pieces of $R^1$ may be the same as or different from each other. Furthermore, in a case where $n^1$ is 3 or 4, only some of $n^1$ pieces of $R^1$ may be the same as each other. The same is true for $n^2$ pieces of $R^2$.

$n^1$ and $n^2$ preferably each independently represent an integer 0 to 3, more preferably each independently represent an integer of 0 to 2, and particularly preferably each independently represent 0 or 1.

Examples of a preferable divalent phenol (B) include bis(4-hydroxyphenyl)sulfone and bis(4-hydroxy-3,5-dimethylphenyl)sulfone.

[Aromatic Polyether Microparticles]

The reduced viscosity of the aromatic polyether constituting the aromatic polyether microparticles as an aspect of the present invention is preferably equal to or lower than 0.36 dL/g, and more preferably equal to or lower than 0.28 dL/g. Furthermore, the reduced viscosity of the aromatic polyether constituting the aromatic polyether microparticles is preferably equal to or higher than 0.18 dL/g, and more preferably equal to or higher than 0.22 dL/g. In an aspect, the reduced viscosity of the aromatic polyether constituting the aromatic polyether microparticles of the present embodiment is preferably equal to or higher than 0.18 dug and equal to or lower than 0.36 dL/g, and more preferably equal to or higher than 0.22 dL/g and equal to or lower than 0.28 dL/g. The higher the reduced viscosity of the aromatic polyether, the easier it is for the heat resistance or the hardness•rigidity of the aromatic polyether microparticles to be improved. However, in a case where the reduced viscosity of the aromatic polyether is higher than 0.36 dL/g, the melt temperature or the methyl viscosity easily increases, and the fluidity is easily reduced.

That is, in a case where the reduced viscosity of the aromatic polyether is equal to or higher than 0.18 dL/g, the heat resistance or the hardness•rigidity of the aromatic polyether microparticles is easily improved. Furthermore, in a case where the reduced viscosity of the aromatic polyether is equal to or higher than 0.36 dL/g, the melt temperature or the melt viscosity of the aromatic polyether microparticles does not become too high, and the fluidity of the aromatic polyether is hardly reduced. The method for adjusting the reduced viscosity of the aromatic polyether constituting the aromatic polyether microparticles will be described later.

In the present specification, as the reduced viscosity of the aromatic polyether constituting the aromatic polyether microparticles, a value measured by the following method is adopted. First, about 1 g of the aromatic polyether microparticles are dissolved in N,N-dimethylformamide. The volume of the obtained solution is controlled to become 1 dL, and a viscosity (q) of the solution is measured at 25° C. by using Ostwald viscometer tube. Furthermore, a viscosity ($\eta_0$) of N,N-dimethylformamide as a solvent is measured at 25° C. by using Ostwald viscometer tube. From the viscosity ($\eta$) of the solution and the viscosity ($\eta_0$) of the solvent, a specific viscosity (($\eta-\eta_0)/\eta_0$) is calculated. The specific viscosity is divided by the concentration of the solution (about 1 g/dL), and the obtained value is adopted as the reduced viscosity (dL/g) of the aromatic polyether constituting the aromatic polyether microparticles.

The number-average molecular weight (Mn) of the aromatic polyether constituting the aromatic polyether microparticles as an aspect of the present invention is preferably equal to or greater than 5,000, and more preferably equal to or greater than 8,000. In a case where Mn of the aromatic polyether constituting the aromatic polyether microparticles is equal to or greater than 5,000, and such aromatic polyether microparticles are used in CFRP, sufficiently high mechanical characteristics are expressed.

Furthermore, the number-average molecular weight (Mn) of the aromatic polyether constituting the aromatic polyether microparticles as an aspect of the present invention is preferably equal to or smaller than 13,000, and more preferably equal to or smaller than 12,000. In a case where Mn of the aromatic polyether constituting the aromatic polyether microparticles is equal to or smaller than 13,000, in producing a composite containing a thermosetting resin and aromatic polyether, the time taken for the aromatic polyether microparticles to dissolve in the liquid thermosetting resin is shortened. In addition, in a case where Mn of the aromatic polyether constituting the aromatic polyether microparticles is equal to or smaller than 13,000, the viscosity of the solution, which is obtained by dissolving the aromatic polyether microparticles in the liquid thermosetting resin, tends to be more sufficiently reduced.

In an aspect, the number-average molecular weight (Mn) of the aromatic polyether constituting the aromatic polyether microparticles as an aspect of the present invention is preferably equal to or greater than 5,000 and equal to or smaller than 13,000, and particularly preferably equal to or greater than 8,000 and equal to or smaller than 11,000.

In the present specification, as Mn of the aromatic polyether constituting the aromatic polyether microparticles, for example, a value can be adopted which is obtained by measuring twice Mn of the aromatic polyether by performing gel permeation chromatography (GPC) analysis under the following condition and calculating the average of the measured values. For measuring Mn of the aromatic polyether, based on a calibration curve obtained by measuring the molecular weight of standard polystyrene, a molecular weight expressed in terms of the standard polystyrene is determined.

(Measurement Condition)

Sample: N,N-dimethylformamide solution containing an aromatic polyether at concentration of 0.002 g/mL Amount of sample injected: 100 μL Column: two pieces of "TSKgel GMHHR-H" (7.8 mmϕ× 300 mm) manufactured by Tosoh Corporation connected in series Column temperature: 40° C.

Eluent: N,N-dimethylformamide

Flow rate of eluent: 0.8 mL/min

Detector: differential refractometer (RI)+light scattering photometer (MALS)

Standard reagent: polystyrene

In the present specification, the viscosity of a solution can be measured, for example, using a B type viscometer ("TVL-20" from TOKI SANGYO CO., LTD.) and a No. 3 spindle rotor under the conditions of a rotation speed of 10 rpm and a measurement temperature of 70° C.

The aromatic polyether microparticles of the present embodiment contain phenolic hydroxyl groups in a content equal to or greater than 80 μmol/g. In the present specification, "phenolic hydroxyl groups contained in the aromatic polyether microparticles" mean hydroxyl groups directly bonded to the aromatic ring to which Z is bonded in Formula (E) representing the repeating unit of the aromatic polyether. Furthermore, the content of the phenolic hydroxyl groups in the aromatic polyether microparticles is represented by moles of the phenolic hydroxyl groups with respect to 1 g of the aromatic polyether microparticles. The content of the phenolic hydroxyl groups in the aromatic polyether as a material forming the aromatic polyether microparticles of the present embodiment is preferably equal to or greater than 80 μmol/g and equal to or smaller than 400 μmol/g. In addition, it is preferable that the aromatic polyether has the phenolic hydroxyl groups on terminals thereof. That is, the aromatic polyether as a material forming the aromatic polyether microparticles according to the present embodiment has a molecular weight lower than that of aromatic polyether of the related art, and contains more phenolic hydroxyl groups compared to aromatic polyether of the related art. In a case where the content of phenolic hydroxyl groups in the aromatic polyether microparticles is equal to or greater than 80 µmol/g, in producing a composite containing a thermosetting resin and aromatic polyether, the viscosity of a solution which is obtained by dissolving the aromatic polyether microparticles in the liquid thermosetting resin can be kept low. Accordingly, it is easy to handle the solution.

The aromatic polyether microparticles of the present embodiment and a thermosetting resin form a cured resin product. The cured resin product has a phase separation structure in which a phase formed of the aromatic polyether and a phase formed of the thermosetting resin are separated from each other. A portion of the phase formed of the aromatic polyether and a portion of the phase formed of the thermosetting resin may react with each other by a reactive group. In a case where the content of the phenolic hydroxyl groups in the aromatic polyether microparticles of the present embodiment is equal to or greater than 80 µmol/g, the aromatic polyether microparticles of the present embodiment can form a cured resin product having a co-continuous phase with the thermosetting resin at a lower temperature compared to aromatic polyether of the related art. The co-continuous phase structure (referred to as continuous phase structure as well) as a phase separation structure is described, for example, in "Polymer Alloy", p. 325 (1993), Tokyo Kagaku Dojin. In the cured resin product having a co-continuous phase, the hardness of each of the phases increases. Furthermore, in the cured resin product having a co-continuous phase, the bond between phases becomes strong. Therefore, the cured resin product having a co-continuous phase has excellent mechanical properties. Consequently, according to the aromatic polyether microparticles of the present embodiment, it is possible to more efficiently obtain CFRP exhibiting excellent mechanical properties with lower energy compared to a case where aromatic polyether of the related art is used.

In contrast, in a case where the content of phenolic hydroxyl groups in the aromatic polyether microparticles is equal to or smaller than 400 µmol/g, the obtained cured resin product exhibits excellent mechanical properties.

The content of phenolic hydroxyl groups in the aromatic polyether microparticles is preferably equal to or greater than 150 µmol/g and equal to or smaller than 240 µmol/g.

The phase separation structure of the cured resin product can be observed by capturing images of the cured resin product by using a scanning transmission electron microscope (hereinafter, referred to as STEM) or a scanning electron microscope (hereinafter, referred to as SEM).

In a case where the cured resin product has a small phase separation structure, a STEM image is captured. First, by using a diamond knife in a microtome, the cured resin product is cut into thin slices having a thickness of 80 nm and collected into a mesh. Thereafter, carbon is vapor-deposited onto the obtained slices, and then by using a field emission-type scanning electron microscope (for example, "S-4800" manufactured by Hitachi High-Technologies Corporation), the slices are observed with the attached STEM detector at 5,000× magnification at an acceleration voltage of 30 kV. In a case where the thermosetting resin is an epoxy resin, in the obtained STEM image, the aromatic polyether phase is observed as contrast darker than the epoxy resin phase.

In a case where the phase separation structure of the cured resin product is big, a SEM image is captured. First, by using a diamond knife in a microtome, a cross section of the cured resin product for SEM observation is prepared. Thereafter, carbon is vapor-deposited onto the obtained cross section, and then in the same manner as described above, by using a field emission-type scanning electron microscope, the cross section is observed with a YAG-type backscattered electron detector at 200× magnification at an acceleration voltage of 15 kV. In a case where the thermosetting resin is an epoxy resin, in the obtained SEM image, the aromatic polyether phase is observed as contrast brighter than the epoxy resin phase.

As will be described later, the content of the phenolic hydroxyl groups in the aromatic polyether microparticles can be adjusted by changing the ratio between monomers used at the time of polymerizing the aromatic polyether. That is, the content of the phenolic hydroxyl groups in the aromatic polyether microparticles can be adjusted by changing the ratio between the dihalogeno compound (A) and the divalent phenol (B). In order to increase the content of the phenolic hydroxyl groups in the aromatic polyether microparticles, it is preferable that the amount of the dihalogeno compound (A) used is smaller than the amount of the divalent phenol (B).

In the present specification, the content (unit: µmol/g) of the phenolic hydroxyl groups in the aromatic polyether microparticles means the amount (unit: µmol) of the phenolic hydroxyl groups per 1 g of the aromatic polyether microparticles. The content of the phenolic hydroxyl groups in the aromatic polyether microparticles is determined as below.

First, a predetermined amount (unit: g) of aromatic polyether microparticles are dissolved in dimethylformamide, and then p-toluenesulfonic acid is added thereto such that potassium phenoxide in the aromatic polyether microparticles is neutralized, thereby forming phenolic hydroxyl groups.

Thereafter, by using a potentiometer and a mixed solution of toluene and methanol containing potassium methoxide in an content of 0.05 mol/L with respect to the total amount (L) of the solution (toluene/methanol=80/20 (v/v)), unreacted p-toluenesulfonic acid in the obtained solution is neutralized. In this way, the number of moles of the p-toluenesulfonic acid used for the reaction is determined, and from the number of moles of the p-toluenesulfonic acid, the number of moles of potassium phenoxide in the aromatic polyether microparticles is determined.

Furthermore, the phenolic hydroxyl groups are neutralized, and from the number of moles of the potassium methoxide used for neutralizing the phenolic hydroxyl groups, the number of moles of the phenolic hydroxyl groups is obtained. From the difference between the number of moles of the phenolic hydroxyl groups and the number of moles of the potassium phenoxide, the number of moles of the phenolic hydroxyl groups in a predetermined amount (unit: g) of aromatic polyether microparticles is obtained. By dividing the obtained number of moles of the phenolic hydroxyl groups by the aforementioned predetermined amount (unit: g) of the aromatic polyether microparticles, the content (unit: µmol/g) of the phenolic hydroxyl groups in the aromatic polyether microparticles is obtained.

In the aromatic polyether microparticles of the present embodiment, a proportion of particles having a particle diameter equal to or smaller than 50.0 µm is equal to or higher than 50% by volume, and preferably equal to or higher than 50% by volume and equal to or lower than 95% by volume, with respect to the total volume of the aromatic polyether microparticles. Herein, the particle diameter and the volume of the particles contained in the aromatic polyether microparticles are values obtained from a particle size distribution curve of the particles determined by a laser diffraction scattering particle size distribution analyzer and measured by the method which will be described later. Accordingly, the volume of the particles in the present embodiment includes voids that can exist in the interior of the particles. In a case where the proportion of the particles having a particle diameter equal to or smaller than 50.0 µm is equal to or higher than 50% by volume, in producing a composite containing a thermosetting resin and aromatic polyether, the dissolution time taken for the aromatic polyether microparticles to dissolve in the liquid thermosetting resin is shortened. In addition, in a case where the proportion of the particles having a particle diameter equal to or smaller than 50.0 µm is equal to or lower than 95% by volume, the solubility of the aromatic polyether microparticles in an epoxy resin is improved. The proportion of the particles having a particle diameter equal to or smaller than 50.0 µm contained in the aromatic polyether microparticles of the present embodiment is more preferably equal to or higher than 70% by volume and equal to or lower than 90% by volume, with respect to the total volume of the aromatic polyether microparticles.

From the viewpoint of shortening the dissolution time of the aromatic polyether microparticles, the maximum particle diameter of the particles contained in the aromatic polyether microparticles is preferably 2 mm. In the present specification, as the maximum particle diameter of the particles, a maximum value in the aforementioned particle size distribution curve of the particles can be adopted. The maximum particle diameter of the particles contained in the aromatic polyether microparticles of the present embodiment is more preferably 1.5 mm, and even more preferably 1 mm.

Furthermore, from the viewpoint of shortening the dissolution time of the aromatic polyether microparticles, in the aromatic polyether microparticles, the proportion of the particles having a particle diameter equal to or smaller than 160 µm is preferably equal to or higher than 95% by volume and equal to or lower than 100% by volume.

The particle diameter of the aromatic polyether microparticles can be adjusted by a physical pulverization method or a chemical pulverization method. Examples of "physical pulverization method" include a method of pulverizing the clumped aromatic polyether obtained by the polymerization reaction by using an impact pulverizer or the like which will be described later. Examples of "chemical pulverization method" include a method of dissolving particles coarser than the intended aromatic polyether microparticles in a solvent and then adding the obtained solution to a solvent which is different from the aforementioned solvent and has low solubility such that the aromatic polyether microparticles are precipitated. In any case, if necessary, a classification step may be additionally performed at a later stage of the coarse particle pulverizing step.

In the present specification, the particle diameter and the volume of the particles contained in the aromatic polyether microparticles are obtained by measuring a particle size distribution curve by a dry method by using a laser diffraction scattering particle size distribution analyzer ("MASTERSIZER 2000" manufactured by Malvern Panalytical Ltd) under the following conditions. Therefore, the proportion of the particles having a particle diameter equal to or smaller than 50.0 µm can be determined from the particle size distribution curve.

The angle of repose of the aromatic polyether microparticles of the present embodiment is preferably equal to or greater than 30° and less than 90°.

The angle of repose of the aromatic polyether microparticles can be adjusted based on the corresponding relationship with a median particle size of the aromatic polyether microparticles in the particle size distribution curve measured by the aforementioned method. The smaller the median particle size of the aromatic polyether microparticles in the particle size distribution, the larger the angle of repose of the aromatic polyether microparticles.

In the present specification. "angle of repose of particles" is an index showing the level of sphericity of the particles. It can be said that the smaller the angle of repose of particles, the closer the particles to a sphere. In a case where the angle of repose of the aromatic polyether microparticles of the present embodiment is equal to or greater than 30°, the aromatic polyether microparticles are sufficiently close to spheres. Accordingly, in producing a composite containing a thermosetting resin and aromatic polyether, it is easy to disperse the aromatic polyether microparticles in the liquid thermosetting resin.

In the present specification, an angle obtained using a powder analyzer (manufactured by HOSOKAWA MICRON CORPORATION, trade name "POWDER TESTER PT-X") is adopted as an angle of repose. Specifically, first, a sample funnel is loaded on a stand of the powder analyzer, a standard sieve having an opening size of 710 µm is superposed thereon, and the sample funnel and the standard sieve are fixed to the stand. Then, the power analyzer is vibrated such that the aromatic polyether microparticles put into the analyzer from above the standard sieve fall onto a round table having a diameter of 8 cm through the sample funnel. After the aromatic polyether microparticles form a mountain in this way, the specimen (mountain of the aromatic polyether microparticles) is imaged using a CCD camera in the front direction, and from the obtained front projection image, the contour of the specimen is extracted. From the extracted contour of the specimen, the angle between the ridge of the mountain and the horizon is determined and adopted as an angle of repose.

In some cases, the aromatic polyether microparticles of the present embodiment contain an organic solvent used as a polymerization solvent at the time of polymerizing the aromatic polyether. The aromatic polyether microparticles of the present embodiment may contain the organic solvent in an amount equal to or greater than 10 ppm and equal to or smaller than 5,000 ppm with respect to the total mass of the aromatic polyether microparticles.

Examples of the organic solvent include organic polar solvents used in the polymerization reaction of the aromatic polyether constituting the aromatic polyether microparticles. Examples of the organic polar solvents include dimethyl sulfoxide, 1-methyl-2-pyrrolidone, sulfolane (referred to as 1,1-dioxothiolane as well), 1,3-dimethyl-2-imidazolidinone, 1,3-diethyl-2-imidazolidinone, dimethylsulfone, diethylsulfone, diisopropylsulfone, diphenylsulfone, and the like.

In the present specification, the amount of the organic solvent in the aromatic polyether microparticles is measured by extracting the organic solvent in the aromatic polyether microparticles by using a mixed solvent of acetone/methanol and analyzing the amount of the organic solvent contained in the obtained extract by gas chromatography. The ratio between the acetone and the methanol in the mixed solvent is 60:40 in terms of volume ratio.

In some cases, the aromatic polyether microparticles of the present embodiment contain the raw materials used in the polymerization reaction of the aromatic polyether or ash produced by the polymerization reaction. The ash content in the aromatic polyether microparticles of the present embodiment may be equal to or greater than 0.01% by mass and equal to or smaller than 0.5% by mass, with respect to the total mass of the aromatic polyether microparticles.

In the present specification, as the ash content in the aromatic polyether microparticles, a value measured by the following method can be adopted. First, 5 g of aromatic polyether microparticles are weighed and put into a platinum crucible and heated and dissolved on an electric heater. Thereafter, the heated and dissolved aromatic polyether microparticles are burned using a gas burner until the particles are carbonized, and then the crucible is put into an electric furnace controlled to be 800±10° C. and heated until black portions (carbonized portions) of the obtained carbide disappear, thereby making ash. Subsequently, the crucible is taken out of the electric furnace, and the obtained solids were left to cool to room temperature in a desiccator. A value calculated from the change in total weight of the aromatic polyether microparticles and the crucible before and after burning is adopted as an ash content in the aromatic polyether microparticles.

The aromatic polyether microparticles as an aspect of the present invention exhibit excellent heat resistance. As one of the indices showing the heat resistance of the aromatic polyether microparticles, a 5% weight loss temperature can be exemplified. For determining the 5% weight loss temperature of the aromatic polyether microparticles, as a sample, 10 mg of the aromatic polyether microparticles are burned by being heated to 800° C. at a heating rate of 10° C./min. At this time, from the obtained TGA curve, a temperature at a point in which the weight of the sample is reduced by 5% based on the weight at 200° C. can be adopted as the 5% weight loss temperature. The 5% weight loss temperature of the aromatic polyether microparticles of the present embodiment is preferably equal to or higher than 498° C., and more preferably equal to or higher than 499° C. Generally, it can be said that the higher the 5% weight loss temperature of the aromatic polyether microparticles, the better the heat resistance of the aromatic polyether microparticles. Furthermore, the 5% weight loss temperature of the aromatic polyether microparticles of the present embodiment is preferably equal to or lower than 530° C., and more preferably equal to or lower than 525° C.

In an aspect, the 5% weight loss temperature of the aromatic polyether microparticles of the present embodiment is preferably equal to or higher than 498° C. and equal to or lower than 530° C., and more preferably equal to or higher than 499° C. and equal to or lower than 525° C.

[Method for Producing Aromatic Polyether]

It is preferable that the polymerization (polycondensation) of the dihalogeno compound (A) and the divalent phenol (B) is performed using an alkali metal salt of carbonic acid as a base. Furthermore, it is preferable that the polymerization is performed in an organic solvent which is a polymerization solvent. In addition, it is more preferable that the polymerization (polycondensation) of the dihalogeno compound (A) and the divalent phenol (B) is performed in an organic solvent by using an alkali metal salt of carbonic acid as a base.

The alkali metal salt of carbonic acid may be alkaline carbonate (carbonate of an alkali metal) which is a normal salt, alkaline bicarbonate (alkaline hydrogen carbonate or hydrogen carbonate of an alkali metal) which is an acidic salt, or a mixture of these (alkaline carbonate and alkaline bicarbonate).

Preferable examples of the alkaline carbonate include sodium carbonate, potassium carbonate, and the like.

Preferable examples of the alkaline bicarbonate include sodium bicarbonate (sodium hydrogen carbonate), potassium bicarbonate (potassium hydrogen carbonate), and the like.

The aforementioned organic solvent is preferably an organic polar solvent.

Examples of the organic polar solvent include dimethyl sulfoxide, 1-methyl-2-pyrrolidone, sulfolane (referred to as 1,1-dioxothiolane as well), 1,3-dimethyl-2-imidazolidinone, 1,3-diethyl-2-imidazolidinone, dimethylsulfone, diethylsulfone, diisopropylsulfone, diphenylsulfone, and the like.

The content of the phenolic hydroxyl groups in the aromatic polyether microparticles is greatly affected by the ratio between the monomers used. That is, the content of the phenolic hydroxyl groups in the aromatic polyether microparticles is greatly affected by the ratio between the dihalogeno compound (A) and the divalent phenol (B). In order to increase the content of the phenolic hydroxyl groups, it is preferable that the amount of the used divalent phenol (B) with respect to the amount of the used dihalogeno compound (A) is small. The amount of the used dihalogeno compound (A) is preferably equal to or greater than 90 mol % and equal to or smaller than 99 mol %, and more preferably equal to or greater than 93 mol % and equal to or smaller than 98 mol %, with respect to the amount of the used divalent phenol (B) (unit: mol). The intended reaction (polymerization) is dehalogenation hydrogen polycondensation between the dihalogeno compound (A) and the divalent phenol (B). Provided that a side reaction does not occur, the closer the molar ratio between the dihalogeno compound (A) and the divalent phenol (B) is to 1:1, the higher the degree of polymerization of the obtained aromatic polyether microparticles tends to be. That is, the closer the amount of the used dihalogeno compound (A) with respect to the amount of the used divalent phenol (B) to 100 mol %, the higher the degree of polymerization of the obtained aromatic polyether microparticles. In a case where the degree of polymerization of the aromatic polyether microparticles is high, the reduced viscosity of the aromatic polyether microparticles tends to increase, and Mn thereof tends to be heightened. However, in reality, due to hydrogenated alkali or the like produced as a byproduct, sometimes a side reaction such as a substitution reaction of a halogen atom with a hydroxy group or depolymerization occurs. Due to these side reactions, the degree of polymerization of the obtained aromatic polyether microparticles is reduced. Therefore, considering the extent of these side reactions, it is necessary to adjust the amount of the dihalogeno compound (A) used so as to obtain aromatic polyether microparticles having predetermined reduced viscosity and Mn.

The molar ratio of the number of moles of the amount of the used alkali metal salt of carbonate expressed in terms of the alkali metal (hereinafter, described as c) to the number of moles of the hydroxy group of the divalent phenol (B) (hereinafter, described as b') is preferably $-0.008<[c/b'-a/b']<0.008$, and more preferably $-0.005<[c/b'-a/b']<0.005$. a represents the number of moles of the dihalogeno compound (A). Provided that a side reaction does not occur, the larger the amount of the used alkali metal salt of carbonate is, the faster the intended polycondensation proceeds. As a result, the degree of polymerization of the obtained aromatic polyether microparticles tends to become high, the reduced viscosity of the aromatic polyether microparticles tends to increase, and Mn thereof tends to be heightened. However, in reality, the larger the amount of the used alkali metal salt of carbonate, the easier it is for the same side reaction as described above to occur. Due to the side reaction, the degree of polymerization of the obtained aromatic polyether microparticles is reduced, and the amount of the terminal potassium phenoxide increases. Therefore, considering the extent of the side reaction, it is necessary to adjust the amount of the used alkali metal salt of carbonate so as to obtain aromatic polyether microparticles having predetermined reduced viscosity and Mn.

In the method for producing aromatic polyether as a material forming the aromatic polyether microparticles, as a first stage, the dihalogeno compound (A) and the divalent phenol (B) are dissolved in an organic polar solvent. As a second stage, an alkali metal salt of carbonate is added to a solution obtained by the first stage such that the dihalogeno compound (A) and the divalent phenol (B) are polycondensed. As a third stage, an unreacted alkali metal salt of carbonate, an alkali halide produced as a byproduct, and the organic polar solvent are removed from a reaction mixture obtained by the second stage, thereby obtaining aromatic polyether.

The dissolution temperature at the first stage is preferably 40° C. to 180° C. Furthermore, the polycondensation temperature at the second stage is preferably 180° C. to 400° C. Provided that a side reaction does not occur, the higher the polycondensation temperature is, the faster the intended polycondensation proceeds. As a result, the degree of polymerization of the obtained aromatic polyether tends to become high, the reduced viscosity of the aromatic polyether tends to increase, and Mn thereof tends to be heightened.

However, in reality, the higher the polycondensation temperature, the easier it is for the same side reaction as described above to occur. Due to the side reaction, the degree of polymerization of the obtained aromatic polyether is reduced, and the amount of the terminal potassium phenoxide increases. Therefore, considering the extent of the side reaction, it is necessary to adjust the polycondensation temperature so as to obtain aromatic polyether having predetermined reduced viscosity and Mn.

In the polycondensation at the second stage, generally, it is preferable to gradually heat up the solution while removing water produced as a byproduct until the temperature reaches a reflux temperature of the organic polar solvent, and then to keep the same temperature. The time from when the temperature has reached the reflux temperature to when the operation of keeping the temperature is finished is preferably 1 to 50 hours, and more preferably 2 to 30 hours. Provided that a side reaction does not occur, the longer the polycondensation time, the further the intended polycondensation proceeds. As a result, the degree of polymerization of the obtained aromatic polyether tends to become high, the reduced viscosity of the aromatic polyether tends to increase, and Mn thereof tends to be heightened. However, in reality, the longer the polycondensation time, the further the same side reaction as described above proceeds. Due to the side reaction, the degree of polymerization of the obtained aromatic polyether is reduced, and the amount of the terminal potassium phenoxide increases. Therefore, considering the extent of the side reaction, it is necessary to adjust the polycondensation time so as to obtain aromatic polyether having predetermined reduced viscosity and Mn.

The content of the phenolic hydroxyl groups in the aromatic polyether microparticles of the present embodiment can be adjusted by changing one or more conditions selected from the group consisting of the mixing ratio between monomers, the amount of the used alkali metal salt of carbonate, the dissolution temperature, the polycondensation temperature, and the polycondensation time described above.

At the third stage, first, from the reaction mixture obtained by the second stage, an unreacted alkali metal salt of carbonate and an alkali halide produced as a byproduct are removed by filtration, extraction, centrifugation, or the like. In this way, a solution is obtained in which aromatic polyether is dissolved in an organic polar solvent. Then, by removing the organic polar solvent from the solution, aromatic polyether is obtained. The organic polar solvent may be directly removed from the aforementioned solution by distillation. Furthermore, the organic polar solvent may be removed by mixing the solution with a poor solvent of the aromatic polyether such that the aromatic polyether is precipitated, and separating the solvent by filtration, centrifugation, or the like. In any case, the organic polar solvent is removed such that the amount of the organic polar solvent (organic solvent) in the finally obtained aromatic polyether microparticles becomes equal to or smaller than 5,000 ppm with respect to the total mass of the aromatic polyether microparticles.

Examples of the poor solvent of the aromatic polyether include methanol, ethanol, 2-propanol, hexane, heptane, and water. Among these, as the poor solvent of the aromatic polyether, methanol is preferable because this makes it easy to remove solvents.

In a case where an organic polar solvent having a relatively high melting point is used as a polymerization solvent, aromatic polyether can be obtained by the following procedure. First, the reaction mixture obtained by the second stage is solidified by cooling and then pulverized. Then, from the obtained powder, an unreacted alkali metal salt of carbonate and an alkali halide produced as a byproduct are removed using water. Furthermore, by using a solvent (extraction solvent) in which the aromatic polyether does not dissolve but the organic polar solvent dissolves (homogeneously mixed with the solvent), the organic polar solvent is removed. In this way, aromatic polyether can be obtained.

In view of extraction efficiency of the organic polar solvent and workability at the time of extraction, the volume average particle size of the aforementioned powder is preferably equal to or greater than 200 µm and equal to or smaller than 2,000 µm, more preferably equal to or greater than 250 µm and equal to or smaller than 1,500 µm, and even more preferably equal to or greater than 300 µm and equal to or smaller than 1,000 µm. In a case where the volume average particle size of the powder is equal to or greater than the lower limit described above (that is, 200 µm), the consolidation of the powder at the time of extraction and the clogging at the time of filtering or drying the powder after extraction are inhibited to a high extent. Furthermore, in a case where the volume average particle size of the powder is equal to or smaller than the upper limit described above (that is, 2,000 µm), the extraction efficiency is heightened.

In the present specification, the volume average particle size of the powder can be obtained by a dry sieving method.

In a case where an organic polar solvent having a relatively high melting point is used as a polymerization solvent, for example, in a case where diphenylsulfone is used as a polymerization solvent, examples of the aforementioned extraction solvent include a mixed solvent of acetone and methanol, and the like. Herein, generally, the mixing ratio between acetone and methanol is determined from the viewpoint of extraction efficiency of the organic polar solvent and fixing properties of the aromatic polyether powder.

In another typical method for producing aromatic polyether different from the production method described above, as a first stage, the divalent phenol (B) and an alkali metal salt of carbonate are reacted in an organic polar solvent, and water produced as a byproduct is removed. As a second stage, the dihalogeno compound (A) is added to a reaction mixture obtained by the first stage such that polycondensation occurs. As a third stage, in the same manner as in the case of the method described above, from a reaction mixture obtained by the second stage, an unreacted alkali metal salt of carbonate, an alkali halide produced as a byproduct, and the organic polar solvent are removed, thereby obtaining aromatic polyether.

At the first stage of another method described above, in order to remove water produced as a byproduct, azeotropic dehydration may be performed by adding an organic solvent that causes azeotropy together with water. Examples of the organic solvent that causes azeotropy together with water include benzene, chlorobenzene, toluene, methyl isobutyl ketone, hexane, cyclohexane, and the like. The temperature of azeotropic dehydration is preferably 70° C. to 200° C.

Furthermore, in another method described above, the reaction temperature of the polycondensation at the second stage is preferably 180° C. to 400° C. Similarly to the case of the method described above, considering the extent of the side reaction, it is necessary to adjust the polycondensation temperature or the polycondensation time so as to obtain aromatic polyether having predetermined reduced viscosity and Mn.

The aromatic polyether microparticles of the present embodiment can be obtained by pulverizing the clumped aromatic polyether obtained by the aforementioned production method by using an impact pulverizer such as a ball mill. The method of physically pulverizing the aromatic polyether by using the impact pulverizer is referred to as "physical pulverization method". The aromatic polyether microparticles obtained after pulverization may be collected as they are without being further processed, or may be subjected to a classification step of reducing coarse particles by using a classifier such as a cyclone or a sieve.

In addition, the aromatic polyether microparticles can also be obtained by a chemical pulverization method. Specifically, by adding a solution obtained by dissolving the aromatic polyether in a solvent to a poor solvent of the aromatic polyether such that aromatic polyether microparticles are precipitated, intended aromatic polyether microparticles can be obtained. Furthermore, after the pulverization step by the chemical pulverization method, the aforementioned classification step may be performed. In any of the methods, the pulverization step is performed such that the proportion of particles having a particle diameter equal to or smaller than 50.0 µm in the finally obtained aromatic polyether becomes equal to or higher than 50% by volume.

According to the aromatic polyether microparticles as an aspect of the present invention, in producing a composite containing a thermosetting resin and aromatic polyether, the dissolution time taken for the aromatic polyether microparticles to dissolve in the liquid thermosetting resin can be shortened. Furthermore, the viscosity of the liquid resin component obtained by dissolving the aromatic polyether microparticles in the thermosetting resin can be kept low. In addition, the temperature at which the thermosetting resin and the aromatic polyether form a cured resin product having a co-continuous phase can be kept low. For these reasons, the aromatic polyether microparticles as an aspect of the present invention exhibit excellent productivity in producing a composite containing a thermosetting resin and aromatic polyether.

<Method for Producing Cured Resin Product>

Hereinafter, as a composite containing a thermosetting resin and aromatic polyether, a cured resin product containing an epoxy resin and aromatic polyether will be described for example, and a method for producing a cured resin product will be described. The method for producing a cured resin product according to the present embodiment includes a step of dissolving the aromatic polyether microparticles described above in an epoxy resin so as to obtain a solution (liquid resin component) and a step of curing the obtained solution so as to obtain a cured resin product.

As the epoxy resin, various epoxy resins which have an epoxy group and can cause a ring-opening polymerization can be used without particular limitation.

Examples of the epoxy resin used in the present embodiment include a glycidyl ether-type epoxy compound obtained by a reaction between epichlorohydrin and polyhydric phenol such as bisphenol A, bisphenol F, bisphenol S, hexahydrobisphenol A, tetramethylbisphenol A, resorcinol, cresol novolac, tetrabromobisphenol A, trihydroxybiphenyl, bisresorcinol, bisphenol hexafluoroacetone, tetramethylbisphenol F, bixylenol, or dihydroxynaphthalene; an alicyclic glycidyl ether-type epoxy compound obtained by hydrogenating the glycidyl ether-type epoxy compound: a polyglycidyl ether-type epoxy compound obtained by a reaction between epichlorohydrin and an aliphatic polyhydric alcohol such as glycerin, neopentyl glycol, ethylene glycol, propylene glycol, butylene glycol, hexylene glycol, polyethylene glycol, or polypropylene glycol; a glycidyl ester-type epoxy compound obtained by a reaction between epichlorohydrin and hydroxycarboxylic acid such as p-oxybenzoic acid or β-oxynaphthoic acid; a polyglycidyl ester-type epoxy compound derived from a polycarboxylic acid such as phthalic acid, methyl phthalate, isophthalic acid, terephthalic acid, tetrahydrophthalic acid, hexahydrophthalic acid, endomethylene tetrahydrophthalic acid, endomethylene hexahydrophthalic acid, trimellitic acid, or a polymerized fatty acid; a glycidyl aminoglycidyl ether-type epoxy compound derived from aminophenol, aminoalkylphenol, or the like; a glycidyl aminoglycidyl ester-type epoxy compound derived from aminobenzoic acid: a flexible epoxy resin having a polyether, polyurethane, polycarbonate, polyester, polyacryl, or silicone skeleton; and the like.

Among these, as the epoxy resin used in the present embodiment, a glycidyl aminoglycidyl ether-type epoxy compound derived from aminophenol, aminoalkylphenol, or the like is preferable.

Furthermore, as the epoxy resin, commercial products can be used. Examples of the commercial products include ELM-100 manufactured by Sumitomo Chemical Co., Ltd.

"Dissolving aromatic polyether microparticles in an epoxy resin" means adding aromatic polyether microparticles to an epoxy resin and dissolving the aromatic polyether microparticles. Herein, "dissolving" means that the aromatic polyether constituting the aromatic polyether microparticles is mixed with the epoxy resin, and the aromatic polyether microparticles and the epoxy resin are not visually differentiated.

The amount of the aromatic polyether microparticles used is preferably equal to or greater than 1 part by mass and equal to or smaller than 40 parts by mass, and more preferably equal to or greater than 5 parts by mass and equal to or smaller than 30 parts by mass, with respect to 100 parts by mass of the epoxy resin.

The dissolution temperature of the aromatic polyether microparticles is not particularly limited, but is preferably 70° C. to 170° C. for example and more preferably 100° C. to 140° C. The dissolution time of the aromatic polyether microparticles is not particularly limited, but is preferably 10 to 50 minutes and more preferably 20 to 40 minutes. In the step of obtaining the solution, for example, a vertical stirrer or the like can be used as a stirrer.

If necessary, the epoxy resin may contain various additives such as a solvent, a curing agent, a curing accelerator, and a release agent.

Examples of the solvent that may be contained in the epoxy resin include dimethyl sulfoxide, N,N-dimethylformamide, N-methylpyrrolidone, dimethyl acetamide, and the like.

Examples of the curing agent that may be contained in the epoxy resin include an organic metal salt, a polyamine-based curing agent, an acid anhydride-based curing agent, a tertiary amine-based compound curing agent, an imidazole-based compound curing agent, a phenol compound, and the like.

Examples of the organic metal salt include zinc naphthenate, cobalt naphthenate, tin octoate, cobalt (II) bisacetylacetonate, cobalt (III) trisacetylacetonate, and the like.

Examples of the polyamine-based curing agent include diethylenetriamine, triethylenetetramine, tetraethylenepentamine, diethylaminopropylamine, polyamidopolyamine, mensendiamine, isophoronediamine, N-aminoethylpiperazine, a 3,9-bis(3-aminopropyl)-2,4,8,10-tetraoxaspiro[5,5]-undene adduct, bis(4-amino-3-methylcyclohexyl)methane, bis(4-aminocyclohexyl)methane, m-xylenediamine, diaminodiphenylmethane, diaminodiphenylsulfone, m-phenylenediamine, dicyandiamide, adipic acid hydrazine, and the like.

Examples of the acid anhydride-based curing agent include phthalic anhydride, tetrahydrophthalic anhydride, hexahydrophthalic anhydride, methyltetrahydrophthalic anhydride, methylhexahydrophthalic anhydride, methyl nadic anhydride, dodecyl succinic anhydride, chlorendic anhydride, pyromellitic anhydride, benzophenone tetracarboxylic anhydride, ethylene glycol bis(anhydrotrimate), methyl cyclohexene tetracarboxylic anhydride, trimellitic anhydride, polyazelaic anhydride, and the like.

Examples of the tertiary amine-based compound curing agent include benzyldimethylamine, 2-(dimethylaminomethyl)phenol, 2,4,6-tri(diaminomethyl)phenol, tri-2-ethylhexanoate of 2,4,6-tri(diaminomethyl)phenol, triethylamine, tributylamine, diazabicyclo[2,2,2]octane, and the like.

Examples of the imidazole-based compound curing agent include 2-methylimidazole, 2-phenyl-4-methylimidazole, 2-ethyl-4-methylimidazole, 2,4-diethylimidazole, 2-phenylimidazole, 2-phenyl-4-methylimidazole, 2-phenyl-4-methyl-5-hydroxyimidazole, 2-phenyl-4,5-dihydroxyimidazole, 2-undecylimidazole, 2-heptadecylimidazole, 1-benzyl-2-methylimidazole, 1-cyanoethyl-2-methylimidazole, and the like.

Examples of the phenol compound include phenol, phenol novolac, bisphenol A, nonyl phenol, and the like.

Examples of curing agents other than the above compounds that may be contained in the epoxy resin include a carboxylic acid such as acetic acid, benzoic acid, or salicylic acid, an organic acid such as p-toluenesulfonic acid, 3,3'-diisopropyl-4,4'-diaminodiphenylmethane, 3,3'-di-t-butyl-4,4'-diaminodiphenylmethane, 3,3'-diethyl-5,5-dimethyl-4,4'-diaminodiphenylmethane, 3,3'-diisopropyl-5,5'-dimethyl-4,4'-diaminodiphenylmethane, 3,3'-di-t-butyl-5,5'-dimethyl-4,4'-diaminodiphenylmethane, 3,3',5,5'-tetraethyl-4,4'-diaminodiphenylmethane, 3,3'-diisopropyl-5,5'-diethyl-4,4'-diaminodiphenylmethane, 3,3'-di-t-butyl-5,5'-diethyl-4,4'-diaminodiphenylmethane, 3,3',5,5'-tetrahydroisopropyl-4,4'-diaminodiphenylmethane, 3,3'-di-t-butyl-5,5'-diisopropyl-4,4'-diaminodiphenylmethane, 3,3',5,5'-tetra-t-butyl-4,4'-diaminodiphenylmethane, 4,4'-diaminodiphenylmethane, 4,4'-diaminodiphenylsulfone, 3,3'-diaminodiphenylsulfone, m-phenylenediamine, m-xylylenediamine, diethyltoluenediamine, and the like.

As the aforementioned curing agent, one kind of each of these compounds including derivatives thereof can be used singly, or two or more kinds of these compounds can be used in combination.

Examples of the curing accelerator that may be contained in the epoxy resin include an imidazole-based accelerator.

Examples of the release agent that may be contained in the epoxy resin include montanic acid and a salt thereof, an ester of montanoic acid, a half ester with a polyhydric alcohol, a stearyl alcohol, stearamide, polyethylene wax such as stearamide, and the like.

In an aspect, the epoxy resin contains 4-4'-dimethylene aniline.

The curing temperature at which the aforementioned solution is heated and cured is not particularly limited as long as the epoxy resin and the aromatic polyether can form a composite at the temperature. The curing temperature is preferably a temperature at which a co-continuous phase can be formed. After preparing a cured resin product on trial by using an epoxy resin and aromatic polyether microparticles, the temperature at which a co-continuous phase can be formed can be determined based on the corresponding relationship between the phase separation structure of the obtained cured resin product and the curing temperature of the aforementioned solution. For example, in a case where the phase separation structure of the obtained cured resin product is a sea-island phase, in order to change the phase separation structure into a co-continuous phase, the curing temperature of the solution may be heightened.

In the method for producing a cured resin product according to an aspect of the present invention, the aforementioned aromatic polyether microparticles are used as a raw material. Therefore, the dissolution time taken for the aromatic polyether microparticles to dissolve in the epoxy resin can be shortened. The dissolution time taken for the aromatic polyether microparticles of the present embodiment to dissolve in the epoxy resin by the following method is equal to or longer than 10 minutes and equal to or shorter than 60 minutes, preferably equal to or longer than 30 minutes and equal to or shorter than 50 minutes, and more preferably equal to or longer than 20 minutes and equal to or shorter than 40 minutes.

[Method]

The aromatic polyether microparticles (15 g) and 100 g of the epoxy resin are weighed and put into a 500 mL separable flask and stirred while being heated at 120° C. with a heating mantle.

In the method for producing a cured resin product according to an aspect of the present invention, the aromatic polyether microparticles are used as a raw material. Therefore, the viscosity of the solution obtained by dissolving the aromatic polyether microparticles in the epoxy resin can be kept low.

Furthermore, the temperature at which the epoxy resin and the aromatic polyether form a cured resin product having a co-continuous phase can be kept low. For these reasons, the method for producing a cured resin product of an aspect of the present invention has excellent productivity.

In an aspect, the phase separation structure of the cured resin product obtained by the production method of the present embodiment is a co-continuous phase. The phase separation structure of the cured resin product is observed by the method described above by using STEM or SEM.

<Method for Producing Carbon-Fiber-Reinforced Composite Material>

Hereinafter, a method for producing a carbon-fiber-reinforced composite material will be described by illustrating a carbon-fiber-reinforced composite material containing an epoxy resin, aromatic polyether, and carbon fiber as an example of a composite containing a thermosetting resin and aromatic polyether. The method for producing a carbon-fiber-reinforced composite material (CFRP) according to the present embodiment includes a step of dissolving the aforementioned aromatic polyether microparticles in an epoxy resin so as to obtain a solution, a step of impregnating carbon fiber with the solution, and a step of curing the solution, with which the carbon fiber is impregnated, so as to obtain a carbon-fiber-reinforced composite material.

Specifically, in the method, a carbon fiber substrate is coated or impregnated with the aforementioned solution, and then the coated or impregnated carbon fiber substrate is heated at a temperature of 120° C. to 140° C. such that the solution in the carbon fiber substrate is semicured, thereby producing CFRP. If necessary, the carbon fiber substrate may be coated or impregnated with the solution after the solution is diluted with a solvent such as dimethyl sulfoxide, N,N-dimethylformamide. N-methylpyrrolidone, or dimethyl acetamide.

By curing the CFRP by means of, for example, heating it at a temperature of 170° C. to 200° C., it is possible to easily produce CFRP having any shape and any form.

In the method for producing a carbon-fiber-reinforced composite material according to an aspect of the present invention, the aforementioned aromatic polyether microparticles are used as a raw material. Therefore, the dissolution time taken for the aromatic polyether microparticles to dissolve in the epoxy resin can be shortened. Furthermore, the viscosity of the solution obtained by dissolving the aromatic polyether microparticles in the epoxy resin can be kept low. In addition, the temperature, at which the epoxy resin and the aromatic polyether form a cured resin product having a co-continuous phase, can be kept low. For these reasons, the method for producing a carbon-fiber-reinforced composite material as an aspect of the present invention has excellent productivity.

In an aspect, the aromatic polyether microparticles as an aspect of the present invention contain a plurality of particles containing an aromatic polyether; in which the content of the particles having a particle diameter equal to or smaller than 50 μm is equal to or higher than 50% by volume and equal to or lower than 95% by volume, preferably equal to or higher than 65% by volume and equal to or lower than 90% by volume, and even more preferably equal to or higher than 70% by volume and equal to or lower than 85% by volume, with respect to the total volume of the aromatic polyether microparticles; the aromatic polyether microparticles contain phenolic hydroxyl groups in a content equal to or greater than 80 μmol/g and equal to or smaller than 400 μmol/g, preferably in a content equal to or greater than 100 μmol/g and equal to or smaller than 380 μmol/g, more preferably in a content equal to or greater than 120 μmolig and equal to or smaller than 360 μmol/g, and even more preferably in a content equal to or greater than 140 μmol/g and equal to or smaller than 340 μmol/g.

In another aspect, the aromatic polyether microparticles as an aspect of the present invention contain a plurality of particles containing an aromatic polyether: in which the content of particles having a particle diameter equal to or smaller than 50 μm is preferably equal to or higher than 50% by volume and equal to or lower than 95% by volume or may be 73% by volume, with respect to the total volume of the aromatic polyether microparticles; and the aromatic polyether microparticles may contain phenolic hydroxyl groups in a content equal to or greater than 80 μmol/g and equal to or smaller than 400 μmol/g or in a content of 160 μmol/g.

EXAMPLES

Hereinafter, an aspect of the present invention will be described based on examples, but the aspect of the present invention is not limited to the examples.

In the present examples, the physical properties of aromatic polyether microparticles were measured by the following method.

<Measurement of Proportion of Particles Having Particle Diameter Equal to or Smaller than 50 μm>

By using MASTERSIZER 2000 manufactured by Malvern Panalytical Ltd (laser diffraction scattering particle size distribution analyzer), a particle size distribution of aromatic polyether microparticles was measured by a dry method, thereby obtaining a volume-based cumulative particle size distribution curve. By using the obtained cumulative particle size distribution curve, a proportion (unit: % by volume) of particles having a particle diameter equal to or smaller than 50 μm in the total volume of the aromatic polyether microparticles was calculated.

<Measurement of a Content of Phenolic Hydroxyl Groups in Aromatic Polyether Microparticles>

In the present specification, the content (unit: μmol/g) of phenolic hydroxyl groups in aromatic polyether microparticles means the content (unit: μmol) of the phenolic hydroxyl groups per 1 g of the aromatic polyether microparticles. The content of the phenolic hydroxyl groups in the aromatic polyether microparticles was determined as below.

First, a predetermined amount (unit: g) of the aromatic polyether microparticles were dissolved in dimethylformamide, and then p-toluenesulfonic acid was added thereto such that potassium phenoxide in the aromatic polyether microparticles was neutralized, thereby forming phenolic hydroxyl groups.

Thereafter, by using a potentiometer and a mixed solution of toluene and methanol containing potassium methoxide in a content of 0.05 mol/L with respect to the total amount (L) of the solution (toluene/methanol=80/20 (v/v)), unreacted p-toluenesulfonic acid in the obtained solution was neutralized. In this way, the number of moles of the p-toluenesulfonic acid used in the reaction was determined, and from the number of moles of the p-toluenesulfonic acid, the number of moles of potassium phenoxide in the aromatic polyether microparticles was determined.

Furthermore, the phenolic hydroxyl groups were neutralized, and from the number of moles of the potassium methoxide used for neutralizing the phenolic hydroxyl groups, the number of moles of the phenolic hydroxyl groups was obtained. From the difference between the number of moles of the phenolic hydroxyl groups and the number of moles of the potassium phenoxide, the number of moles of the phenolic hydroxyl groups in a predetermined amount (unit: g) of aromatic polyether microparticles was obtained. By dividing the obtained number of moles of the phenolic hydroxyl groups by the aforementioned predetermined amount (unit: g) of the aromatic polyether microparticles, the content (unit: μmol/g) of the phenolic hydroxyl groups in the aromatic polyether microparticles was obtained.

Production of Aromatic Polyether (PES) Microparticles

Example 1

Bis(4-hydroxyphenyl)sulfone (300.3 g), bis(4-chlorophenyl)sulfone (330.8 g), and diphenylsulfone (560.3 g) as a polymerization solvent were put into a polymerization tank including a stirrer, a nitrogen introduction pipe, a thermometer, and a condenser tipped with a receiver, and heated to 180° C. in a state where a nitrogen gas was flowing in the system. Potassium carbonate (159.7 g) was added to the obtained solution, and then the solution was gradually heated to 290° C. and further reacted for 3 hours at 290° C. The obtained reaction solution was solidified by being cooled to room temperature and finely pulverized, then washed with warm water several times and washed with a mixed solvent of acetone and methanol several times, and then dried by being heated at 150° C., thereby obtaining aromatic polyether sulfone coarse powder. The coarse powder was pulverized using an impact pulverizer and classified, thereby obtaining PES microparticles of Example 1.

In the aromatic polyether sulfone coarse powder of Example 1, a proportion of particles having a particle diameter equal to or smaller than 50 μm in the total volume of the aromatic polyether microparticles was 73% by volume. Furthermore, the content of phenolic hydroxyl groups in the aromatic polyether microparticles was 160 μmol/g.

Comparative Example 1

SUMIKAEXCEL PES 5003P manufactured by Sumitomo Chemical Co., Ltd. was used. In the PES microparticles of Comparative Example 1, a proportion of particles having a particle diameter equal to or smaller than 50 μm in the total volume of the PES microparticles was less than 2% by volume. Furthermore, the content of phenolic hydroxyl groups in the PES microparticles was 55 μmol/g.

Comparative Example 2

SUMIKAEXCEL PES 5003P manufactured by Sumitomo Chemical Co., Ltd. used in Comparative Example 1 was pulverized using an impact pulverizer and classified, thereby obtaining PES microparticles of Comparative Example 2. In the PES microparticles of Comparative Example 1, a proportion of particles having a particle diameter equal to or smaller than 50 μm in the total volume of PES was 61% by volume. Furthermore, the content of phenolic hydroxyl groups in the PES microparticles was 55 μmol/g.

<Evaluation of PES Microparticles>
[Measurement of Dissolution Time in Liquid Epoxy Resin (Evaluation 1)]

PES microparticles (15 g) of Example 1 or Comparative Example 1 and 100 g of an epoxy resin (manufactured by Sumitomo Chemical Co., Ltd., "ELM-100") were weighed and put into a 500 mL separable flask. The PES microparticles and the epoxy resin were stirred while being heated at 120° C. with a heating mantle, and whether or not the PES microparticles were dissolved in the epoxy resin was visually checked. In a case where the PES microparticles dissolved, the time taken for the PES microparticles to dissolve was measured. The results are shown in Table 1.

[Measurement of Viscosity of Liquid Resin Component (Evaluation 2)]

For a liquid resin component which was obtained in evaluation 1 and in which the PES microparticles dissolved in the epoxy resin, by using a B type viscometer ("TVL-20" from TOKI SANGYO CO., LTD.) and a No. 3 spindle rotor, the viscosity was measured under the conditions of a rotation speed of 10 rpm and a measurement temperature of 70° C. The results are shown in Table 1.

TABLE 1

| | Aromatic polyether microparticles | | | |
| --- | --- | --- | --- | --- |
| | Content of phenolic hydroxyl groups (μmol/g) | Proportion of particle having particle diameter equal to or smaller than 50 μm (% by volume) | Dissolution time (min) | Viscosity of resin component (Pa · s) |
| Example 1 | 160 | 73 | 30 | 3 |
| Comparative Example 1 | 55 | <2 | >400 | 8.7 |

As is evident from Table 1, the dissolution time taken for the PES microparticles of Example 1 to dissolve in the epoxy resin was shorter than the dissolution time for the PES microparticles of Comparative Example 1 to dissolve in the epoxy resin. Furthermore, the viscosity of the resin component using the PES microparticles of Example 1 was lower than the viscosity of the resin component using the PES microparticles of Comparative Example 1.

[Checking Phase Separation Structure (Evaluation 3)]

An epoxy resin (bisphenol A-type diglycidyl ether manufactured by TOKYO CHEMICAL INDUSTRY CO., LTD.) (50 g) and 11.3 g of the PES microparticles obtained in Example 1 or Comparative Example 2 were put into a 200 mL beaker, and stirred for 10 minutes at room temperature. The mixture was heated and stirred for 4 hours under the condition of 120° C. which was the temperature of an oil bath, thereby dissolving the PES microparticles in the epoxy resin. Thereafter, while the solution was being heated and stirred, 4,4'-dimethylene aniline (13.3 g) as a curing agent was added to the solution, and the solution was heated and stirred for 10 minutes under the condition of 80° C. which was the temperature of an oil bath. The obtained solution was put into a mold and cured by being heated using an oven under the curing condition shown in Table 2. The phase separation structure of the obtained cured product was analyzed by the following procedure.

Analysis method for Example 1: Because the size of the phase separation structure was small, STEM observation was performed. First, by using a diamond knife in a microtome, the obtained cured product was cut into thin slices having a thickness of 80 nm and collected into a mesh. Thereafter, carbon was vapor-deposited onto the obtained slices, and then by using a field emission-type scanning electron microscope S-4800 manufactured by Hitachi High-Technologies Corporation, the slices were observed with a STEM detector at 5,000× magnification at an acceleration voltage of 30 kV. According to this observation method, the aromatic polyether phase is observed as a contrast darker than the epoxy resin phase.

Analysis method for Comparative Example 2: Because the size of the phase separation structure was big, SEM observation was performed by the following procedure. First, by using a diamond knife in a microtome, a cross section for SEM observation of the obtained cured product was prepared. Thereafter, carbon was vapor-deposited onto the obtained cross section, and by using a field emission-type scanning electron microscope S-4800 manufactured by Hitachi High-Technologies Corporation, the cross section was observed with a YAG-type backscattered electron detector at 200× magnification at an acceleration voltage of 15 kV. According to this observation method, the aromatic polyether phase is observed as contrast brighter than the epoxy resin phase.

Figure 2:
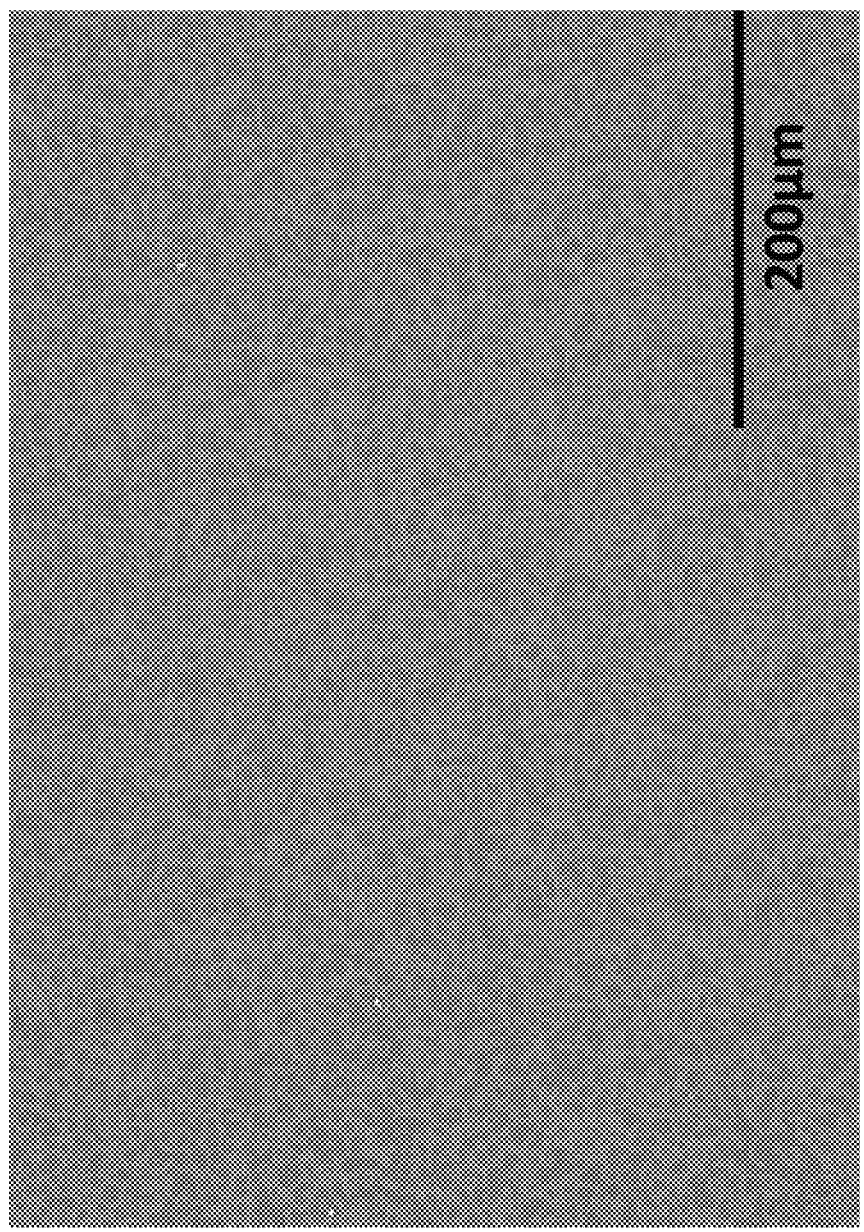
FIG. 2 is a SEM image showing a phase separation structure of Comparative Example 2.
Figure 3:
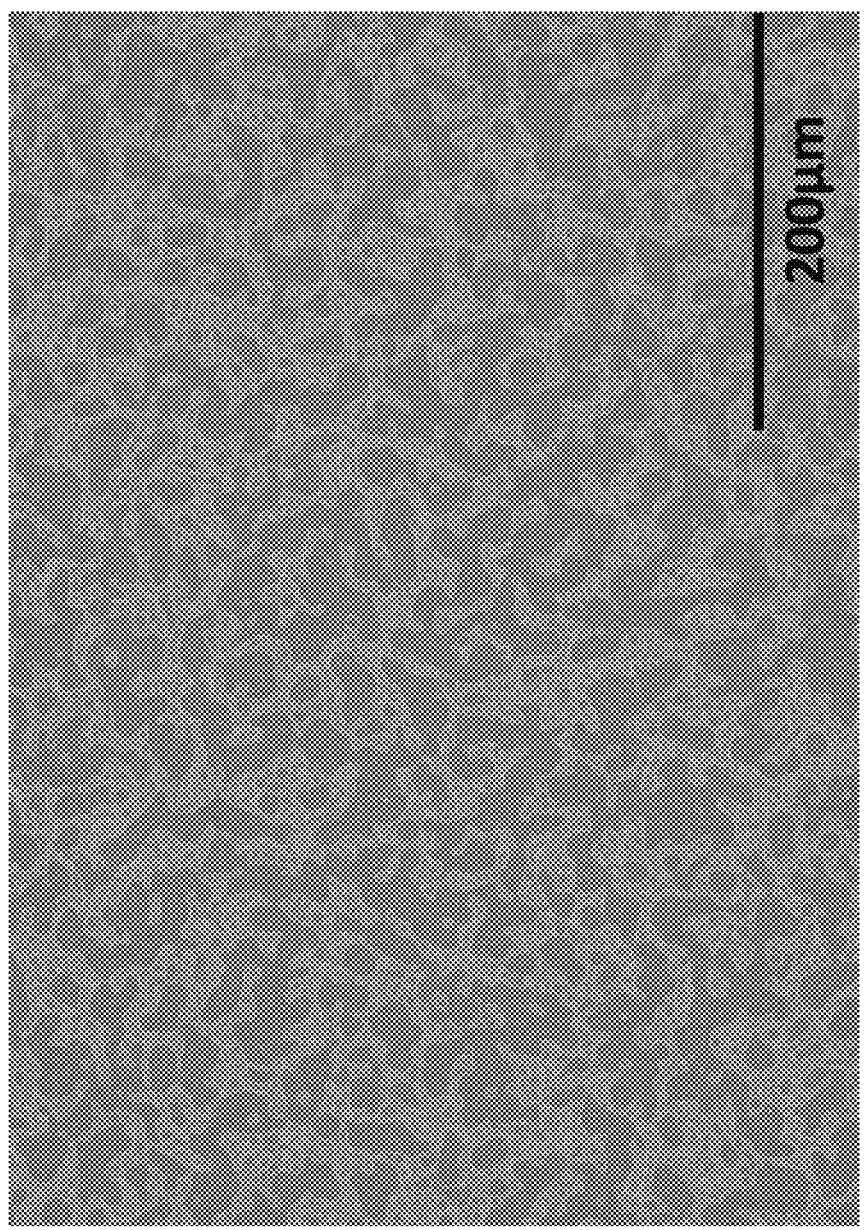
FIG. 3 is a SEM image showing a phase separation structure of Comparative Example 2.

The results are shown in Table 2 and FIGS. 1 to 3.

TABLE 2

| | Aromatic polyether microparticles | | | |
|---|---|---|---|---|
| | Content of phenolic hydroxyl groups (µmol/g) | Proportion of particles having particle diameter equal to or smaller than 50 µm (% by volume) | Curing condition | Phase separation structure |
| Example 1 | 160 | 73 | 120° C. × 2 hours | Co-continuous phase |
| Comparative Example 2 | 55 | 61 | 125° C. × 2 hours | Sea-island phase |
| | 55 | 61 | 150° C. × 2 hours | Co-continuous phase |

A mixture of an epoxy resin and aromatic polyether is known to form a phase separation structure such as a co-continuous phase or a sea-island phase as a result of curing reaction. In a micrograph, the sea-island phase is observed as a structure in which approximately spherical islands formed of one resin are present in the sea formed of another resin.

In contrast, the co-continuous phase is observed as two continuous phases having distorted shapes.

Generally, a composite formed of a thermosetting resin and a thermoplastic resin is known to exhibit better mechanical properties by forming a co-continuous phase.

FIG. 1 is a STEM image of the phase separation structure of Example 1. From the image, it is possible to confirm that the cured resin product of Example 1 forms a co-continuous phase.

FIG. 2 is a SEM image of the phase separation structure of Comparative Example 2 formed under the condition of 125° C.×2 hours. From the image, it is possible to confirm that the cured resin product of Comparative Example 2 cured under the condition of 125° C.×2 hours forms a sea-island phase. FIG. 3 is a SEM image of the phase separation structure of Comparative Example 2 formed under the condition of 150° C.×2 hours. From the image, it is possible to confirm that the cured resin product of Comparative Example 2 cured under the condition of 150° C.×2 hours form a co-continuous phase.

As shown in Table 2, the composite using the PES microparticles of Example 1 exhibited a co-continuous phase under the curing conditions of 120° C. and 2 hours. In contrast, the composite using the PES microparticles of Comparative Example 2 exhibited a sea-island phase under the curing conditions of 125° C. and 2 hours. Furthermore, the composite using the PES microparticles of Comparative Example 2 exhibited a co-continuous phase under the curing conditions of 150° C. and 2 hours. That is, in a case where the PES microparticles as an aspect of the present invention are used, it is possible to form a cured resin product having a co-continuous phase at a lower curing temperature.

From the above results, it was confirmed that the present invention is useful.

INDUSTRIAL APPLICABILITY

An object of the present invention is to provide aromatic polyether microparticles which exhibit excellent productivity in producing a composite containing a thermosetting resin and aromatic polyether. Furthermore, according to the present invention, it is possible to provide a method for producing a cured resin product and a method for producing a carbon-fiber-reinforced composite material in which the aromatic polyether microparticles are used. Therefore, the present invention is industrially extremely useful.

What is claimed is:

1. Aromatic polyether microparticles comprising:
   a plurality of particles containing an aromatic polyether
   wherein a content of the particles having a particle diameter equal to or smaller than 50 µm is equal to or higher than 50% by volume with respect to a total volume of the aromatic polyether microparticles,
   wherein the aromatic polyether microparticles contain phenolic hydroxyl groups in a content equal to or greater than 80 µmol/g, and
   wherein the number-average molecular weight (Mn) of the aromatic polyether constituting the aromatic polyether microparticles is equal to or greater than 5,000 and equal to or less than 13,000.

2. The aromatic polyether microparticles according to claim 1,
   wherein a maximum particle diameter is 2 mm and
   wherein a content of the particles having a particle diameter equal to or smaller than 160 µm is equal to or higher than 95% by volume with respect to the total volume of the aromatic polyether microparticles.

3. The aromatic polyether microparticles according to claim 1, which have an angle of repose equal to or greater than 30°.

4. The aromatic polyether microparticles according to claim 1, wherein the aromatic polyether has a reduced viscosity equal to or lower than 0.36 dL/g.

5. The aromatic polyether microparticles according to claim 1, comprising:
   an organic solvent in an amount equal to or smaller than 5,000 ppm with respect to a total mass of the aromatic polyether microparticles.

6. The aromatic polyether microparticles according to claim 1, wherein an ash content is equal to or smaller than 0.5% by mass with respect to a total mass of the aromatic polyether microparticles.

7. A method for producing a cured resin product, comprising:
   a step of dissolving the aromatic polyether microparticles according to claim 1 in an epoxy resin to obtain a solution; and
   a step of curing the solution to obtain a cured resin product.

8. A method for producing a carbon-fiber-reinforced composite material, comprising:

a step of dissolving the aromatic polyether microparticles according to claim 1 in an epoxy resin to obtain a solution;

a step of impregnating carbon fiber with the solution; and a step of curing the solution, with which the carbon fiber is impregnated, to obtain a carbon-fiber-reinforced composite material.

* * * * *